United States Patent Office 3,029,278
Patented Apr. 10, 1962

3,029,278
PROCESS FOR SEPARATION OF
PHTHALIC ACIDS
Charles A. Spiller, Jr., Joliet, Ill., and Russell V. Malo, Munster, Ind., assignors to Standard Oil Company, Chicago, Ill., a corporation of Indiana
No Drawing. Filed Dec. 11, 1958, Ser. No. 779,538
11 Claims. (Cl. 260—524)

This invention relates to the separation of isophthalic acid from terephthalic acid. It is concerned with means for producing purified isophthalic acid of better than 95 percent purity, and preferably better than 99 percent purity, and is particularly concerned with means for circumventing a constant-ratio solute which has prevented recovery of isophthalic acid exceeding about 90 percent purity from mixtures containing greater than about 10 percent terephthalic acid. The invention provides an improved method for recovering pure isophthalic acid, and terephthalic acid, in processes producing mixed phthalic acids as an oxidation product from a mixed dialkylbenzenes feed such as mixed xylenes. It also provides a method for producing isophthalic acid of high purity from crude metaxylene or other metadialkylbenzene source which may be contaminated with a para-dialkylbenzene.

A serious problem in the production of isophthalic and terephthalic acids has been the separation of the pure acids when mixed feeds are used as oxidation feed stocks. The cheapest and generally most abundant raw material source for phthalic acids is the commercial xylenes mixture, obtainable either from coal tar sources or by separation from selected petroleum fractions. Commercial mixed xylenes usually contain ethylbenzene and small amounts of non-aromatics in addition to the three xylenes isomers, with meta-xylene ordinarily predominating, although the proportion of non-aromatics can be kept low by use of solvent extraction in the separation of the xylene from coal tar or petroleum $C_8$ aromatic fractions.

Although commercial $C_8$ aromatic mixtures can be resolved by various techniques to recover the individual isomers in high purities, the most practical processes require extensive superfractionation combined with fractional crystallization at low temperatures and/or chemical treatment, and therefore are expensive and difficult to operate. Of the $C_8$ aromatic isomers, high purity orthoxylene is most readily recovered, using superfractionation; para-xylene requires low temperature fractional crystallization; and meta-xylene usually requires combined fractionation and stepwise fractional crystallization and/or chemical treatment to recover a high purity product.

Since the largest chemical use of the xylenes is in conversion by oxidation to corresponding phthalic acids, a number of techniques have been proposed for oxidizing mixed xylenes, including the commercial $C_8$ aromatic mixtures and various mixtures of meta- and para-xylenes. The separation problem then is changed from pre-separation of xylenes (or other dialkyl benzenes) to post-separation of the acids mixture recoverable from the $C_8$ oxidate. Because of solubility differences, the mixture of crude acids using various solvents can be separated fairly readily into individual isomeric fractions, which, with the exception of isophthalic acid, can then be readily purified to produce commercially acceptable products. Thus, by selective leaching and/or crystallization from a solvent such as water or alcohol or acetic acid, for example, essentially pure terephthalic acid, phthalic acid and benzoic acid can be readily obtained. The phthalic acid can be dehydrated to the anhydride and in this form can be further purified by distillation. Benzoic acid also can be further purified by distillation.

The recovery of pure isophthalic acid (95+% purity), however, presents a special problem. Solutions saturated with respect to isophthalic and terephthalic acids usually result in a mixed solute with the isophthalic and terephthalic in the ratio of about nine to one. Extensive investigation in our laboratories has confirmed that this constant ratio solute occurs as a binary eutectic of isophthalic and terephthalic acids in ternary systems containing a solvent as the third component, after crystallization from a wide range of solvents including water, alcohols, such as methanol or ethanol, organic acids such as acetic acid, various special solvents, such as dimethyl formamide and dimethyl sulfoxide, and the like. The ratio also appears to hold over a broad temperature range, and although slight variation has been noted with some solvents, or in the presence of a third solute component such as orthophthalic acid, separation of one component of the constant ratio solute mixture from another by fractional crystallization does not appear to be possible on any commercially feasible scale. The ratio of acids in the constant ratio solute mixture has been found to vary from about 85% to 95% of isophthalic and 5% to 15% terephthalic with different solvents and at various temperatures. For water, we have found that the ratio lies in the range of 85% to 89% isophthalic to 11% to 15% terephthalic acid. It is believed, however, that these variations are the result of analytical and experimental difficulties, and to the best of our knowledge, the constant ratio solute mixture appears to be 87% to 89% isophthalic to 11% to 13% terephthalic, or in round numbers, a ratio of 9 to 1, which will be used hereinafter.

The existence of the above described constant ratio solute has made the separation of isophthalic acid of greater than 90% purity from any source containing, or providing, 10% or more of terephthalic acid an extremely difficult task. The crude isophthalic acid cannot be purified by distillation, and as noted above, a selective solvent permitting separation by fractional crystallization in a practical process has not been found. Other known physical properties are not sufficiently different to provide an economically feasible means of separating the two acid isomers. Although the isomers can be separated by chemical means, such as selective reactions or conversions to products that can be separated by distillation or otherwise, these methods are very expensive.

The present invention is based on the discovery that when the constant ratio solute of isophthalic and terephthalic acids is crystallized from solution under controlled conditions, a mixture of individual crystals of the acids is obtained differing sufficiently in size distribution to permit separation thereof by size classification or other means based upon differences in physical size of the two crystalline components. Although some differences in crystal size may be observed whenever a crystallization of isophthalic and terephthalic acids is carried out, large crystals of isophthalic acid can be selectively recovered with relatively small crystals of terephthalic acid when the process of crystallization is conducted carefully so that controlled nucleation and crystal growth occur. The difference in size can thus be controlled to permit separation by various known techniques of size classification such as screening, settling elutriation, centrifugation, and the like.

According to one embodiment of the invention, a process is provided for separating isophthalic and terephthalic acids by forming a solution of the acids in a solvent in proportions approximating the constant ratio solute, namely about 9 parts of isophthalic acid to one part of terephthalic acid, supersaturating the solution and maintaining the resulting solution in a state of supersaturation for a period of time permitting crystal nucleation or seed growth without substantial precipitation of crystalline material. Crystallization is completed by controlled cooling of the magma. The resulting crystalline mass is then subjected, advantageously in the form of the magma produced by the crystallization, to size classification whereby a large-crystal fraction enriched in isophthalic acid is separated from a small-crystal fraction. In conducting the size classification, the cut-point is a matter of choice depending upon design factors, including product purity desired, efficiency of the separation equipment, and the like. It has been found, however, that in a single pass as much as 95% of the isophthalic acid in the feed mixture can be recovered in 95 to 98% purity as the oversize product from a 325 mesh screen while yielding a fines fraction containing about 50% to 85% terephthalic acid, which can, of course, be profitably reprocessed for recovery of pure terephthalic acid and/or additional recovery of isophthalic acid.

In our experimental work with the process of the invention, it has also been discovered that the use of water as the solvent for the crystallization of the isophthalic-terephthalic acid mixture has substantial advantages. Although the solubility of the acids is low in water at normal temperatures, solubility increases rapidly as the temperature is increased. For example, the solubility of isophthalic acid increases from about 0.8 lb. in 100 lbs. of water at 250° F. to about 33 lbs. at 400° F. We have found, therefore, that it is advantageous to operate above about 200° F., using pressure to maintain the liquid phase. In the preferred operation of the invention, the isophthalic and terephthalic acids to be separated are dissolved in hot water under super-atmospheric pressure, and the steps of concentrating and/or cooling the solution to effect supersaturation followed by nucleation and crystallization are controlled by pressure to maintain the desired varying rate of cooling and rate of evaporation of the water solvent. Maximum capacity in terms of equipment requirements is thus obtained, while an important measure of flexibility and sensitivity in control of the nucleation and crystallization steps is provided.

It has been further discovered in our experimental evaluation of the new process that a number of size classification techniques can be used to separate the crystalline mass into various fractions ranging in size distribution from virtually 100% pure isophthalic acid crystals of large size range through fractions of decreasing average size range and concentration of isophthalic acid to virtually 100% terephthalic acid of smallest average size range. The separation, for example, can be effected by sieving, preferably using wet screening techniques as by passing a slurry of the precipitated crystalline mass over rake-type screens. Elutriation, centrifugation and various other known classification techniques are suitable, and illustrate that a variety of physical classification techniques based upon differences in size, shape or density may be used. It has been found, however, that liquid cyclones, of the type available under the trade name, Dorrclones, offer special advantages in the way of high capacity combined with sharpness of separation. Using a 4″ liquid cyclone, for example, upwards of 95% of the isophthalic acid in an 87 weight percent feed mixture can be recovered in the form of 95% or better purity isophthalic acid, as underflow typically of +325 mesh particle size.

In the production of pure phthalic acids, the invention has been found to have the greatest value in circumventing the isophthalic-terephthalic acid constant ratio solute, referred to above. Indeed, it has been found almost indispensable from this standpoint in the production of pure isophthalic acid from mixtures containing more than about 10% by weight of terephthalic acid in relation to the isophthalic acid content of the mixture. In practicing this aspect of the invention, it is usually most practicable to leach the constant ratio solute mixture of isophthalic and terephthalic acids away from excess terephthalic acid. The controlled crystallization of the invention, with resulting size differentiation, is then performed on the resulting solution. The impure terephthalic acid which is separated in the source of size classification as a fines stream is recycled with advantage to the terephthalic acid recovery operation. Hence, in this aspect of the invention, improvement in recoverable yield of terephthalic acid produceable in a mixed acids oxidation process is provided by means of the separation technique of the invention.

It has also been found that the technique of the invention lends itself so well to commercial large scale operation that it affords substantial advantages in the purificaiton of crude isophthalic acid, which may be contaminated with less than 10% by weight of terephthalic acid and therefore is not subject to the separation limitations of the constant ratio solute mixture. By way of illustration, upwards of 85 weight percent recovery of 99.8% isophthalic acid can readily be made by subjecting the crude material to controlled nucleation-crystallization followed by size classification. The invention in this sense has substantial value in providing means for producing pure isophthalic acid (99+%) from a crude meta-xylene containing as much as 10% paraxylene by integration with any suitable oxidation process. Crude meta-xylene of about 90–95% purity can be recovered fairly readily from commercial xylene sources whereas 98+% meta-xylene (in terms of paraxylene content) requires extensive and expensive prepurification.

The invention will be further described with the aid of a number of illustrative examples.

Example I

The feasibility of the separation technique is illustrated in the following simple example:

A mixture of 85.9% isophthalic acid, 11.6% terephthalic acid and 2.5% orthophthalic acid is dissolved in water at 345° F., and is slowly cooled over a period of five hours at the rate of 9° F. the first hour, 8° F., the second hour, 11° F., the third hour, 47°F., the fourth hour and the fifth hour. The resulting magma then is rapidly cooled to room temperature, and the crystals are removed from the mixture by filtration. A sample of the crystals is separated according to crystal size by water washing through standard screens. The analytical data for the different mesh size ranges are as follows:

| Mesh Size | Distribution, Wt. Percent | Cum., Wt. Percent | Chemical Anal., Wt. Percent | |
|---|---|---|---|---|
| | | | Isophthalic Acid (IA) | Terephthalic Acid (TA) |
| 35 | 10.3 | 10.3 | 98.1 | 1.9 |
| 60 | 26.6 | 36.9 | 96.8 | 3.6 |
| 80 | 15.7 | 52.6 | 94.3 | 3.9 |
| 100 | 8.5 | 61.1 | 94.7 | 4.2 |
| 150 | 9.1 | 70.2 | 91.2 | 4.7 |
| 200 | 5.5 | 75.7 | | |
| 270 | 6.1 | 81.8 | 94.2 | 4.9 |
| 325 | 2.4 | 84.2 | | |
| Thru 325 | 15.7 | 99.9 | 69 | 30.4 |

A second sample of the cooled precipitated crystals is separated by elutriation in a 3′ column using water as a carrier to continuously carry over a small percentage of crystals. The residue remaining in the column is enriched in the isophthalic acid component. The data obtained are quite similar in result to the above tabulated screening data. About 20% of the mixture is obtained as 98% isophthalic acid, or about 60% as 95% isophthalic acid. These fractions can be further purified by recrystallization or re-running, and the remaining terephthalic acid rich portions can be extracted with water to give pure terephthalic acid with additional 85 to 90% isophthalic acid for recycle. Thus, the starting mixture can be completely resolved into two pure components.

Example II

In this example, the production of a higher yield of

95+% isophthalic acid is illustrated. A large autoclave is charged with 834 parts of distilled water and 53 parts of mixed phthalic acids containing 46 parts isophthalic, 6 parts terephthalic and 1 part ortho-phthalic acids. The contents of the autoclave are heated to 337° F. until a homogeneous solution is obtained. The solution is then concentrated to effect supersaturation by evaporative cooling. In the first step of the concentration, the temperature is reduced to about 327° F. over a period of about 15 minutes at which temperature a saturated solution would contain 97% of the isophthalic acid charged, taking into account the water loss. In the next step of cooling, isophthalic acid nuclei grow to seed crystals before permitting sufficient cooling by evaporation to grow large isophthalic acid crystals. The temperature is reduced from 327° F. to about 300° F. in this step over a period of about two hours. The temperature is then more rapidly lowered by reduction to atmospheric pressure over a period of about 30 minutes to an hour. Under the above described conditions, isophthalic acid crystal growth appears to be favored in comparison to terephthalic acid crystal growth. The particle size distribution of the crystals and their analyses, as obtained after wet screening, is as follows:

| Mesh Size | Wt., Percent | Cum., Wt. Percent | Chemical Analyses, Wt. Percent | |
|---|---|---|---|---|
| | | | Isophthalic Acid | Terephthalic Acid |
| Feed | | | 87.3 | 11.6 |
| 35 | 29.4 | 29.4 | 98.8 | 1.5 |
| 48 | 15.0 | 44.4 | 98.4 | 1.4 |
| 65 | 14.4 | 58.8 | 97.3 | 2.2 |
| 80 | 11.5 | 70.3 | 97.1 | 1.5 |
| 100 | 2.7 | 73.0 | 94.4 | 3.1 |
| 150 | 3.5 | 76.5 | 95.7 | 3.5 |
| 200 | 2.7 | 79.2 | 96.2 | 2.5 |
| 250 | 0.8 | 80.0 | 94.6 | 4.2 |
| 325 | 0.8 | 80.8 | 94.1 | 5.2 |
| Thru 325 | 19.2 | 100.0 | 38.3 | 60.1 |

Yield of IA (on 100% basis)—87.2%.

*Example III*

In this example, a mixture of about 65 parts isophthalic acid and 35 parts terephthalic acid is extracted with water at 340° F. The saturated aqueous solution at 340° F. contains 8 lbs. of a mixture comprising 88% isophthalic acid and 12% terephthalic acid per 100 lbs. of water. The residue from the extraction comprises pure (99+%) terephthalic acid. The saturated solution at 340° F. is cooled over a period of 5 minutes to 336° F. by evaporation of solvent. The solution is thereafter cooled over a period of 60 minutes from 336° F. to 332° F. The solution is then cooled as rapidly as possible to 212° F. (30 minutes). Following this cooling schedule, a crystal distribution is obtained recovering over 90% of the total isophthalic acid present in the original feed mixture as 95+% pure isophthalic acid by classification in a liquid cyclone system with a 40 micron cut-point.

*Example IV*

This example illustrates a two-stage purification procedure for producing very high purity isophthalic acid. The product from the classification described in Example II is separated into two particle size fractions, larger and smaller than 200 mesh. The crystals retained on the 200 mesh screen average 96.1% isophthalic acid, 3.2% terephthalic acid and 0.7% phthalic acid. An autoclave is charged with 222 parts of water and 12.7 parts of the 96.1% isophthalic acid. The contents of the autoclave are heated at 339° F. to form a homogeneous solution. The resulting solution is cooled by evaporation to 330° F. in about 15 minutes and then is cooled slowly to about 260° F. over a period of three hours. The mixture is then rapidly cooled to the normal boiling point of water over a period of about 5 to 10 minutes. The resulting magma is cooled to room temperature, and the crystals are separated according to size by wet screening. The crystals having a particle size greater than a 325 mesh provide a yield of 85% isophthalic acid of 99.7% purity. The terephthalic acid content of the particle size fractions is determined by comparison of the appropriate ultraviolet spectrum with that of a laboratory preparation of isophthalic acid made from 99.7% meta-xylene which after further purification is assumed to result in 100% pure isophthalic acid. The analytical data are set out in the following table:

| Mesh Size | Wt. Percent, Retained on Screen | TA, Wt. Percent |
|---|---|---|
| 35 | 16.0 | −0.22 |
| 48 | 16.5 | 0.07 |
| 65 | 21.2 | 0.17 |
| 80 | 5.5 | 0.16 |
| 100 | 6.5 | 0.38 |
| 150 | 9.7 | 0.50 |
| 200 | 5.0 | 0.93 |
| 250 | 2.4 | 1.48 |
| 325 | 2.3 | 2.60 |
| Thru 325 | 14.9 | 8.7 |

*Example V*

In this example, the product of the cooling run described in Example II is separated into +200 and −200 mesh fractions. The +200 fraction averages 96.1% isophthalic acid, 3.2% terephthalic acid and 0.7% phthalic acid. An autoclave is charged with 222 parts of water and 12.7 parts of the 96.1% isophthalic acid. The contents of the autoclave are heated for one hour at 339° F., and the resulting solution is cooled slowly over a period of about two hours to 291° F., just above the solution saturation point for the terephthalic acid content of the mixture. The solution is then separated from the crystals at 290 F. by passing the solution under pressure through a bayonet micrometallic filter. The terephthalic acid content of the isophthalic product is determined as in Example IV by appropriate ultraviolet spectrum analysis to be 0.1%.

*Example VI*

In this example, the product from the cooling run described in Example II is again separated into two particle-size fractions of +200 and −200 mesh. The +200 mesh fraction averages 96.1% isophthalic acid, 3.2% terephthalic acid and 0.7% phthalic acid. An autoclave is charged with 100 parts of water and 12 parts of 96.1% isophthalic acid (sufficient water to dissolve the terephthalic acid content of the +200 fraction). The contents of the autoclave are heated for two hours at 339° F. The slurry is then filtered to separate the isophthalic acid crystals from the dissolved terephthalic acid.

Approximately 37.6% of the charged solids are taken into solution. The remaining undissolved solids average better than 99% isophthalic acid purity as compared to the 96.1% purity of the feed. The dissolved solids analyze 90.7% isophthalic acid, 8.0% terephthalic acid and 1.3% phthalic acid.

*Example VII*

In this example, the production of pure isophthalic and terephthalic acids by oxidation of mixed xylenes in a process integrating the separation technique of the invention is illustrated. Although any feasible system for effecting the oxidation of dialkylbenzenes to produce substantial yields of mixed acids may be used, for the purposes of this invention we shall describe use of the invention in connection with the bromine-promoted oxidation system which has been described in Belgian Patent No. 546,191 of Mid-Century Corporation since this process has been demonstrated to have certain outstanding advantages for oxidation of mixed xylenes feeds.

The feed comprises a mixture of meta-, para- and ortho-xylenes in proportions of about 2:1:1. The feed also contains about 5% ethylbenzene. The feed is charged to an oxidation reactor with about 200 parts of acetic acid per 100 parts of feed, 2 parts of manganese acetate, and about 1 part of tetra-bromoethane. The oxidation is conducted by passing air into the reaction mixture at the rate of about 400 liters per hour while supplying heat. Reaction initiates at about 125° F., and thereafter the reaction is self-sustaining, with the temperature being maintained in the region of about 250 to 400° F. at a pressure of 300–400 p.s.i.g. The reaction is essentially complete after about 30 minutes. The mixed phthalic acids are separated from the reaction mixture by crystallization and centrifugation. By separating at a temperature above about 140° F., substantially all of the benzoic acid is retained in the mother liquor from which it can be recovered by conventional means.

The crude phthalic acid cake is dried to remove residual acetic acid and is leached with water at about 205° F. to dissolve the orthophthalic acid. The isophthalic and terephthalic acid is recovered by centrifuging the resulting slurry. The orthophthalic acid of about 98% purity is recovered from the filtrate by crystallization, and may be further purified conventionally to phthalic anhydride by distillation and dehydration. Pure terephthalic acid is recovered by leaching the mixed isophthalic and terephthalic acid crystals with water at about 365° F. The resulting terephthalic acid slurry may be thickened by circulation through a thickening device, e.g., a liquid cyclone, taking care to maintain all of the isophthalic acid in solution. The thickened terephthalic acid slurry is water washed to displace the mother liquor and is then centrifuged to recover 99% terephthalic acid as product. The crude isophthalic acid solution, containing about 10% by weight of terephthalic acid in the solute is advantageously passed through a carbon treating system for color improvement and removal of impurities. The treated filtrate is cooled by evaporation to about 200° F. by reduction in pressure from 150 p.s.i.g. to atmospheric. The cooling rate is controlled to hold the solution slightly below the isophthalic acid saturation temperature, taking into account water loss, for the first 30–60 minutes. The solution is then cooled as rapidly as feasible to about 200° F. The resulting slurry is pumped through a liquid cyclone to separate the isophthalic acid and terephthalic acid. The underflow is about 90% of the original isophthalic acid at a purity of 95%. The overflow containing about 1:1 isophthalic to terephthalic acid is thickened from 1% to 30% in liquid cyclones. The thickened slurry is recycled to the isophthalic-terephthalic acid separation step; the clear filtrate is sent to storage for re-use as a leach liquor.

The 95% isophthalic acid crystals are redissolved by addition of hot water at about 360° F. and is recrystallized from the resulting solution. The mixed isophthalic-terephthalic acid crystals are reclassified by flow through a liquid cyclone. A 99.5+% isophthalic acid product is recovered as the +325 mesh underflow. The product is centrifuged, washed with water, and dried. The dilute terephthalic acid slurry and the wash water are returned to the terephthalic acid recovery operation.

*Example VIII*

This example shows that the presence of additional components in the solute mixture, or in the solvent, does not interfere with the crystallization. In a large kettle, there are charged 136 parts of a 9:1 mixture of isophthalic and terephthalic acids, 2179 parts of water, 6 parts of orthophthalic acid, 1.2 parts of benzoic acid, and 22.7 parts of acetic acid. The kettle contents are heated to 339° F. and evaporatively cooled as follows:

Time, min.:                                Kettle temp., °F.
0 ------------------------------------- 339
10 ------------------------------------ 327
60 ------------------------------------ 324
120 ----------------------------------- 304
185 ----------------------------------- 212

The particle size distribution and chemical analyses of the product crystals are tabulated below:

| Mesh Size | Wt. Percent | OA | Chemical Analysis, Wt. Percent | |
|---|---|---|---|---|
| | | | IA | TA |
| 35 | 16.6 | 0.2 | 98.6 | 3.6 |
| 48 | 10.4 | 0.2 | 95.6 | 3.7 |
| 65 | 12.9 | 1.1 | 95.8 | 3.4 |
| 80 | 7.4 | 0.4 | 95.7 | 3.2 |
| 100 | 5.5 | 0.3 | 98.1 | 3.3 |
| 150 | 10.4 | 0.2 | 97.3 | 3.9 |
| 200 | 6.7 | 0.1 | 97.8 | 4.5 |
| 250 | 6.1 | 1.3 | 95.7 | 6.6 |
| 325 | 4.3 | 3.0 | 83.5 | 16.4 |
| Thru 325 | 19.6 | 7.8 | 36.6 | 60.2 |
| | 99.9 | | | |

It will be seen from the above illustrative examples that the invention can be applied in various forms to operate on various types of feed mixtures, and that it may be advantageously applied in the form of an integrated recovery operation in the production of pure individual phthalic acids from a mixed alkylbenzene feed such as mixed xylenes. Mixed xylenes usually contain from about 10 to 25% paraxylene, about 30 to 55% meta-xylene, about 15 to 30% ortho-xylene, about 5 to 35% ethylbenzene and from 0 to 10% paraffins and naphthenes in the $C_8$ aromatic boiling range. The mixed xylenes can be oxidized by a number of known means to recover an oxidate comprising a mixture of the three isomeric phthalic acids and benzoic acid. For example, the mixed xylenes can be oxidized by a chemical oxidant, e.g., nitric acid, or they can be oxidized by air or oxygen in the liquid phase in the presence of a heavy metal oxidation catalyst. In the latter case, however, it is highly advantageous to employ a source of bromine as a promoter or co-catalyst according to the technique recently described in Belgian Patent No. 546,191 of Mid-Century Corporation in order to avoid infeasibly high recycle requirements becauseof the low conversions obtaining in the presence of the metal catalyst alone. In addition, other techniques may be used to produce mixtures of phthalic acids containing isophthalic acid which when contaminated with terephthalic acid may be profitably treated according to the method of the invention. Oxidation feeds other than xylenes also may be employed, e.g., mixed diisopropylbenzenes, ethylbenzenes, cymenes, and the like, as well as intermediate oxidation products thereof, e.g., toluic acids, tolualdehydes, etc.

The oxidate mixture is advantageously subjected to a primary separation using water or other suitable solvent such as acetic acid or an alcohol in order to separate isophthalic and terephthalic acids from the more soluble phthalic and benzoic acids. Assuming that now the isophthalic acid is admixed with more than the proportion of terephthalic acid forming the constant solute ratio, i.e., more than about 10% by weight, the excess terephthalic acid is separated from the isophthalic-terephthalic acids constant ratio solute mixture. Because of the greater solubility of isophthalic acid in most solvents (about 9 times greater), this separation is readily effected by dissolving the isophthalic-terephthalic acid "pseudo-eutectic" mixture away from the terephthalic acid, which then is left in better than 99% purity. As shown in the above examples, this operation may be advantageously conducted by leaching with water heated above the normal boiling point under superatmospheric pressure. The constant composition solute ratio has been found to prevail at least over the temperature range of about 90° F. to about 500° F. In the lower portion of the range, however, the capacity of the solvent is too small for desirable commercial operations.

Although water is a particularly desirable solvent for the practice of the invention, the nature of the solvent does not appear to be critical. Thus, a wide range of solvents including organic acids such as acetic acid, alcohols, such as methanol or ethanol, polar organic solvents such as dimethyl formamide, etc., all appear suitable. In treating a relatively pure feed such as 90 to 98% isophthalic acid contaminated with 2 to 10% terephthalic acid, as may be derived from oxidation of an appropriate mixture of meta- and para-xylenes, acetic acid has the advantage that it may be used both as the oxidation reaction solvent as well as the medium from which the crystallization of isophthalic acid is effected.

The crystallization can be conducted under a variety of temperature conditions, depending upon the particular solvent and the crystallization equipment employed. The crystallization, however, should be controlled as has been described above in order to provide for a substantial period where nucleation is predominant relative to crystal growth. The phenomenon of nucleation, and the factors affecting it as a step in crystallization, is well known to the art. See, for example, the description of crystallization by Warren L. McCabe in the Chemical Engineers' Handbook, McGraw-Hill, 1950, pp. 1051–1070. See also the section on Crystallization in the Encyclopedia of Chemical Technology by Kirk and Othmer, volume 4, p. 619. In crystal formation, both nuclei formation and crystal growth occur as distinct phenomena of the supersaturated state. Indeed, it is possible to observe the effect of nucleation, when the period of supersaturation is extended, by visual means in the form of the so-called Tyndall effect. In the practice of the invention, the crystallization process may be initiated by effecting supersaturation of the solution by any known means of cooling and/or concentration. It is important, however, to extend the period of supersaturation, at least with respect to isophthalic acid, for a period of time sufficient to permit substantial nucleation to occur, without concurrent crystal growth. Usually a period of nucleation in excess of about 15 minutes is desirable, advantageously about 30 to 60 minutes, but the actual time required will vary somewhat depending on the concentration of solution, temperature, degree of agitation, and other environmental factors.

It has been found that the best means of control during this period of seed growth is by limitation of the rate at which solids come out of solution expressed in terms of weight of solids that precipitate per unit volume of solution or magma per unit of time. The rate of crystallization, expressed in this manner, should be slow enough to prevent substantial formation of crystalline material. During the period of nucleation or seed growth, a magma develops and the appearance changes from a clear solution to a relatively opaque fluid mass. In texture, it is smooth and definitely fluid and shiny-like but without the appearance of discrete particles. Even without agitation, there is only a slight tendency for solid material to settle. When the magma is looked at with a flashlight, there should be a substantial absence of free crystals or "rhinestones."

More specifically, in following the procedure described above, e.g. in Example VII by way of illustration, the 9:1 solution is charged (or made up in) a crystallizing kettle. The kettle is equipped for agitation, e.g. as with impeller blades and may be jacketed for heating with Dowtherm, superheated steam or other heat exchange fluid. The kettle is constructed for operation at superatmospheric pressure and provided with an overhead condensing system for reduction to atmospheric pressure. In operation, the kettle is heated and pressured up to 360° F., about 140 p.s.i.g. steam pressure. Care should be taken to bring everything into solution by use of excess solvent. This may be checked by cooling until the solution diffuses a light beam, indicating formation of nuclei and seed crystals. The solution then is reheated until clear which also can be checked by light beam. The solution is saturated with terephthalic acid and may contain about 15 percent excess solvent referred to the isophthalic acid saturation point. This solution contains about 14 pounds of dissolved solids per 100 pounds of solvent. With greater than 12.5 percent terephthalic acid in the feed, there may be a trace of undissolved terephthalic acid. Assuming a saturation point of 358° F., the solution is cooled sufficiently to effect supersaturation. The amount may vary considerably up to about 15° F., depending upon the starting temperature level, composition and concentration of solution, solvent, etc. With water at 358° F., usually about 4 to 5° F. of cooling is sufficient to pass through the "cloud point" (at which the first trace of materials out of solution appear) to a state where the mass of magma changes to an opaque smooth slurry of satin-like sheen and without the appearance of discrete particles. From this point, time for nucleation and/or seed growth should be provided so that any substantial precipitation of solid crystalline material is avoided.

The rate of cooling, as by release of pressure in the example, should be controlled to prevent rapid release of solids from solution. In this respect, it should be recognized that at higher temperature levels relatively minor changes in temperature compared to operation at lower temperature levels result in significantly greater changes in the physical state of the system because of the much higher capacity of the solvent as temperature is increased.

Thus in a run in a kettle designed for 100 p.s.i.g. maximum operation, the initial conditions of saturation were 6.35 pounds of 9:1 feed per 100 pounds of water at 336° F. The solution was cooled about 10° F. during the first 30 minutes of operation and about 2–3° F. lower in the next 30 to 40 minutes of operation without forming a discrete crystalline phase. During the first two hours of operation, the rate at which solids (calculated as isophthalic acid) was released from solution was 0.0264 pound per 100 pounds of water per minute, resulting in precipitation of roughly one-third of the solids charged without formation of a definite discrete crystalline phase. At this point, crystallization was completed by rapid cooling from about 305° F. to 212° F. in about 30 minutes. The resulting purity of the product after separation in a liquid cyclone to recover +325 mesh and through 325 mesh fractions was 97.6% isophthalic acid in the +325 mesh fraction.

By contrast, in a kettle designed for operation at 150 p.s.i.g., the initial saturation conditions were 12.55 pounds of 9:1 feed per 100 pounds of water at 358° F. Taking this temperature as a "cloud point," it was necessary to limit the rate of cooling to about 4° F. in the first 10 to 15 minutes and to about 10° F. for the first two hours to obtain comparable purity. The rate of solids released amounted to 0.0377 pound per 100 pounds of water per minute. When the rate was increased to 0.0675 pound per 100 pounds of water per minute, the percent of terephthalic acid in the +325 mesh isophthalic acid product increased from 2.9 percent to 5 percent.

Because of the relatively much greater solubility of isophthalic acid than terephthalic acid, it is convenient to express the rate of solids precipitation as pounds of isophthalic acid per unit of volume per unit of time. It has been found desirable to control the rate so as to precipitate up to about 30 to 40 percent of the solids during the period of crystal seed growth following supersaturation. During this period, it is desirable to maintain efficient agitation in order to prevent the formation of concentration gradients of saturated and supersaturated solution. It is desirable to provide sufficient agitation to prevent agglomeration and to design the mixing equipment so as to minimize foaming.

When the crystallization is controlled in above manner, the process is independent of temperature, volume and nature of solvent. Once the period of nucleation and seed growth has been concluded, the stage of actual crystallization can be conducted as rapidly as is convenient in the equipment available. Thereafter, the solution can usually be cooled as rapidly as the conditions and equipment permit to the minimum crystallization temperature. By comparison with this rapid rate of cooling, the rate of cooling while effecting nucleation, therefore, is slow. In conducting crystallization experiments, it has been noted that if the period of supersaturation is not extended so as to permit nucleation, and the solution is rapidly cooled to the minimum crystallization temperature, the mixture of isophthalic and terephthalic acids comes down as a crystalline mass which does not show the marked difference in particle size distribution which is utilized, according to the preferred practice invention, to separate the acids. Also, it will be appreciated that the crystals of both isophthalic and terephthalic acids can be made larger by improving the conditions of contact between the growing crystals and the supersaturated solution, but that the isophthalic crystals will still be relatively larger.

Referring to the principles of the invention in practice, it has been found that under some conditions, terephthalic acid can be concentrated in a large-crystal fraction recovered after physical classification. For instance, the reactor effluent from an oxidation process of the type described in Example VII at reaction temperature may contain terephthalic acid dissolved in acetic acid in a concentration substantially exceeding the 9:1 solute ratio that has been referred to herein. The reaction mixture, containing, for example, 30% terephthalic and 70% isophthalic acids on an orthophthalic free basis, is conveniently discharged into the reactor surge tank for cooling prior to processing for product recovery. If the reactor effluent is discharged into the liquid phase of the surge tank, a significant concentration of terephthalic acid in a large-crystal fraction, e.g., +200 or +325 mesh, recovered by size separation is found. On the other hand, if the reactor is discharged by flushing into the vapor zone of the surge tank, very little concentration of the acids by size occurs. As an illustration, data are obtained by cooling a reaction mixture containing about 30 weight percent terephthalic acid and 70% isophthalic acid (ignoring orthophthalic acid content) in acetic acid is cooled to about 330° F. in the reactor and flushed into a surge tank where it is further cooled to 190° F. in 4¼ hours, and then to 140° F. in another ¾ hour. When the reactor effluent is discharged into the liquid phase at 225° F., 43.9% of the total crystals, recovered after filtration or centrifuging, are retained on 200 mesh. The concentration of terephthalic acid in the large-crystals is 64%, and that of the isophthalic 36%. When the reactor effluent is flashed into the vapor phase in the surge tank at 235° F., 15.4% of the total crystals are larger than 100 mesh, and the proportions of terephthalic and isophthalic acids are 37% and 63%, respectively.

The foregoing illustrates that it is feasible to separate terephthalic acid as a large-crystal fraction from isophthalic acid by physical classification when the terephthalic acid is present in the mixture in a concentration exceeding the 9:1 isophthalic to terephthalic ratio. A solution saturated with respect to terephthalic acid is formed, the solution is supersaturated in a manner including terephthalic acid, the solution then is cooled to crystallize its solute components, and the components are separated by one or more physical classification operations recovering large-crystal and small-crystal fractions. Orthophthalic acid, when present, is recovered in classification predominantly as large crystals, but can be readily leached away from either fraction with a solvent such as water.

Various types of crystallization equipment can be employed, including batch and continuous crystallizers. The batch type crystallizers can be of the jacket cooled type or may be operated on the principle of evaporative cooling. In practice, the use of crystallizers which are cooled by evaporation has been found particularly useful. With water, the most suitable range of conditions appears to be from about 250 to about 400° F., and at about 15 p.s.i.g. to about 300 p.s.i.g.

The crystalline mass can be subjected to various types of size separation, but it is advantageous to treat the mixture as a slurry in the crystallization mother liquor. Although sieving or wet screening provides a convenient separation means on a small scale, separation by centrifugation or gravity settling in hydraulic equipment is preferred for large scale operations. Partial re-solution of product for separation by difference in solution rate followed by filtration can also be used as a separation technique. In particular, however, the use of liquid cyclones with variable discharge openings has been found advantageous. For example, using a commercial liquid cyclone, 97.2% of the isophthalic acid in the feed mixture has been recovered as a bottoms discharge fraction having a purity of 95%. In settling rate tests, it has been found that the 250+ mesh fraction of isophthalic acid crystals has a settling rate of about 18' per hour, permitting feasible separation using gravity separators, e.g., a modified thickener discharging the small terephthalic acid crystals at the periphery overflow, or a typical hydroclassifier. The crystal size range varies somewhat with the solvent and crystallization conditions, but in general, it has been found that crystals greater than 250 mesh (+62 microns) usually analyze +95% isophthalic acid. Variation in this respect, however, is a matter which is readily subject to control. For example, the particle size distribution curve may be plotted from screening data for any feed and crystallization conditions, which will clearly indicate the cut-point for any desired purity or percent recovery.

In evaluation of multi-stage techniques, it has been found that recrystallization followed by reclassification appears to have a significant advantage in terms of recoverable yield of 99+% purity product compared to other second stage techniques. For example, upwards of 85% recovery of 99.8% isophthalic acid has been made by this technique compared to 63% recovery of 99.5% isophthalic acid by the technique of leaching away the terephthalic acid in the 95% isophthalic acid mixture and filtering to recover the purified isophthalic acid. Where the entire 95% isophthalic acid mixture is redissolved, and the isophthalic acid then is fractionally crystallized from the solution, a recovery of 72% is obtained. In using multi-stage purification, it is preferred to use a feed of at least 95% isophthalic acid purity to the second stage in order to obtain 99+% purity product. Various purification steps, e.g., adsorptive contacting for removal of color bodies, and similar operations can be integrated at any desired stage in the multi-stage operation.

Hence, the invention provides a simple and inexpensive separation technique for separating isophthalic and terephthalic acids, using common solvents and well-known size classification means. The invention provides means for overcoming the problem of the "pseudoeutectic" which has militated against production of pure isophthalic acid from any but carefully pre-purified feed stock sources. In this sense, then, the invention provides a value separation technique for integration with various oxidation processes that charge mixed feeds or crude meta-dialkylbenzene feeds for production of phthalic acids.

This application is a continuation-in-part of S.N. 701,970, filed December 11, 1957, now abandoned.

We claim:

1. A process for separating isophthalic and terephthalic acids from mixtures containing a major portion of isophthalic acid and a minor proportion of terephthalic acid which comprises forming a solution containing both acids in a solvent therefor, cooling the solution slowly at a controlled rate at a temperature sufficiently high to contain a substantial content of said acids in the saturated state to a temperature whereat the solution is supersaturated with respect to isophthalic acid while gradually establishing visible nucleation in said solution without however effecting substantial precipitation of crystalline material therefrom, thereafter cooling the solution at a relatively rapid rate to a temperature whereat substantially the bulk of said acids is precipitated from the solution as a crystalline mass and separating from the resulting crystalline mass a relatively large-crystal fraction enriched in isophthalic acid and a relatively small-crystal fraction enriched in terephthalic acid.

2. The process of claim 1 in which the cooling operations are conducted by evaporation of the solvent.

3. The process of claim 1 in which the solvent is water.

4. The process of claim 3 in which the solution is initially maintained at a temperature of 250 to 400° F. under steam pressure and in which the pressure is gradually reduced to atmospheric.

5. The process of claim 1 in which the size classification is conducted by subjecting the magma resulting from the crystallization to the action of centrifugal force.

6. The process of claim 5 in which the physical classification step is conducted by passing the magma resulting from the crystallization through a liquid cyclone to separate over-flow and under-flow fractions.

7. A process for separating a crystalline mixture of isophthalic and terephthalic acids containing a minor proportion of terephthalic acid which however is in excess of a constant solute ratio of isophthalic acid to terephthalic acid approximating 9 to 1 which comprises leaching isophthalic acid out of said mixture with water at a temperature sufficiently high to contain a substantial content of isophthalic acid in the saturated state leaving as residue terephthalic acid in excess of such constant solute ratio and thereby forming a solution containing isophthalic and terephthalic acids in the approximate proportions of such constant solute ratio, separating the terephthalic acid residue, supersaturating the resulting solution by cooling at a controlled rate to a temperature whereat the solution is supersaturated with respect to isophthalic acid while gradually establishing visible nucleation in said solution without however effecting substantial precipitation of crystalline material therefrom, thereafter cooling the solution at a relatively rapid rate to a temperature whereat substantially the bulk of said acids is precipitated from the solution as a crystalline mass, and thereupon subjecting the resulting crystalline mass to separation by physical size classification means to recover a large-crystal fraction enriched in isophthalic acid and a small-crystal fraction.

8. A process for purifying isophthalic acid which is contaminated with relatively small quantities of terephthalic acid in an amount less than a constant solute ratio of isophthalic acid to terephthalic acid approximating 9–1 which comprises forming a solution in at least sufficient solvent to dissolve the terephthalic acid at a temperature sufficiently high to contain a substantial content of isophthalic acid in the saturated state, supersaturating the resulting solution by cooling at a controlled rate to a temperature whereat the solution is supersaturated with respect to isophthalic acid while gradually establishing visible nucleation in said solution without however effecting substantial precipitation of crystalline material therefrom, thereafter cooling the solution at a relatively rapid rate to a temperature whereat substantially the bulk of said acids is precipitated from the solution as a crystalline mass, and thereupon subjecting the resulting crystalline mass to separation by physical size classification means to recover a large-crystal fraction enriched in isophthalic acid and a small-crystal fraction.

9. In the production of phthalic acids by oxidation of a mixture of xylenes, the method of product separation which comprises treating an oxidate mixture containing mixed phthalic acids to separate crude isophthalic acid containing terephthalic acid therefrom, forming a solution of isophthalic and terephthalic acids as solute components in a solvent therefor at a temperature sufficiently high to contain a substantial content of said acids in the saturated state, supersaturating the resulting solution by cooling at a controlled rate to a temperature whereat the solution is supersaturated with respect to isophthalic acid while gradually establishing visible nucleation in said solution without however effecting substantial precipitation of crystalline material therefrom, thereafter cooling the solution at a relatively rapid rate to a temperature whereat substantially the bulk of said acids is precipitated from the solution as a crystalline mass, and thereupon subjecting the resulting crystalline mass to separation by physical size classification means to recover a large-crystal fraction enriched in isophthalic acid and a small-crystal fraction.

10. In the production of phthalic acids by oxidation of a mixture of xylenes, the method of product separation which comprises leaching an oxidate mixture containing the mixed phthalic acids with water to recover a filtrate containing orthophthalic acid and a residue containing isophthalic acid and terephthalic acids, separately leaching said residue with water at elevated temperature to recover a filtrate containing a mixture comprising approximately 9 parts of isophthalic acid to 1 part of terephthalic acid and a residue of substantially pure terephthalic acid, supersaturating the resulting solution by cooling at a controlled rate to a temperature whereat the solution is supersaturated with respect to isophthalic acid while gradually establishing visible nucleation in said solution without however effecting substantial precipitation of crystalline material therefrom, thereafter cooling the solution at a relatively rapid rate to a temperature whereat substantially the bulk of said acids is precipitated from the solution as a crystalline mass, and thereupon subjecting the resulting crystalline mass to separation by physical size classification means whereby a large crystal fraction enriched in isophthalic acid is separated from a small-crystal fraction containing terephthalic acid, and recycling said small-crystal fraction with solvent to the second mentioned leaching step.

11. A multi-stage process for separating pure isophthalic acid from a crude mixture containing terephthalic acid which comprises forming a solution of the crude isophthalic acid which contains a ratio of isophthalic acid to terephthalic acid in the solubility ratio of approximately 9 to 1, in a solvent therefor at a temperature sufficiently high to contain a substantial content of said acids in the saturated state, supersaturating the resulting solution by cooling at a controlled rate to a temperature whereat the solution is supersaturated with respect to isophthalic acid while gradually establishing visible nucleation in said solution without however effecting substantial precipitation of crystalline material therefrom, thereafter cooling the solution at a relatively rapid rate to a temperature whereat substantially the bulk of said acids is precipitated from the solution as a crystalline mass, and thereupon subjecting the resulting crystalline mass to separation by physical size classification means to recover a large-crystal fraction enriched in isophthalic acid and a small-crystal fraction whereby a large-crystal fraction enriched in isophthalic acid is separated from a small-crystal fraction, dissolving said large-crystal fraction in a solvent, recrystallizing isophthalic and terephthalic acid therefrom by repeating the beforementioned sequence of steps including supersaturation of the solution while effecting nucleation therein without crystallization, subsequent crystallization and finally size classification of the resulting crystalline mass, whereby a second purified large-crystal fraction enriched in isophthalic acid is separated from a second small-crystal fraction.

(References on following page)

References Cited in the file of this patent

UNITED STATES PATENTS

| | | |
|---|---|---|
| 2,699,456 | Kimball et al. | Jan. 11, 1955 |
| 2,794,832 | Rietema | June 4, 1957 |
| 2,848,488 | Himel | Aug. 19, 1958 |

FOREIGN PATENTS

| | | |
|---|---|---|
| 440,691 | Great Britain | Jan. 3, 1936 |

OTHER REFERENCES

Perry: Chemical Engineer's Handbook, 3 ed., pages 1050–1061 (1950).